United States Patent [19]

Nyman

[11] 4,140,322
[45] Feb. 20, 1979

[54] MECHANICAL SEAL

[75] Inventor: Lars-Erik Nyman, Enebyberg, Sweden

[73] Assignee: ITT Industries, Inc., New York, N.Y.

[21] Appl. No.: 866,095

[22] Filed: Dec. 30, 1977

[30] Foreign Application Priority Data

Jan. 19, 1977 [SE] Sweden .................................. 7700504

[51] Int. Cl.² .......................... F16J 15/34; F16J 15/54
[52] U.S. Cl. .......................................... 277/9; 277/41;
277/65; 277/93 SD; 277/188 R; 277/136
[58] Field of Search ................................ 277/9, 38–41,
277/9.5, 65, 87, 81 R, 93 R, 93 SD, 136, 187,
117, 188 R, 189

[56] References Cited

U.S. PATENT DOCUMENTS

| 2,027,505 | 1/1936 | Winkler | 277/38 |
| 2,560,917 | 7/1951 | Bebinger | 277/188 R X |
| 3,157,404 | 11/1964 | Doble | 277/38 X |
| 3,405,959 | 10/1968 | Walker | 277/74 X |
| 3,561,775 | 2/1971 | Sturlason | 277/93 SD X |
| 3,588,128 | 6/1971 | Peterson | 277/93 SD |
| 3,689,083 | 9/1972 | Greenawalt | 277/40 |
| 3,758,179 | 9/1973 | Smith | 277/41 X |

FOREIGN PATENT DOCUMENTS 1195132 6/1970 United Kingdom .................. 277/93 R Primary Examiner—Robert S. Ward, Jr.
Attorney, Agent, or Firm—John T. O'Halloran; Peter C. VanDer Sluys

[57] ABSTRACT

The rotatable seal ring of a mechanical seal is attached to a plain shaft by a grip ring and a housing that includes a disc spring. The rotatable seal ring is pressed against the non-rotatable ring by the disc spring, the compression of which is uniquely controlled by the depth of a recess formed in the housing to receive the grip ring.

4 Claims, 2 Drawing Figures

MECHANICAL SEAL

BACKGROUND OF THE INVENTION

1. Field of the Invention

This invention relates to mechanical seals and more precisely to a device for attaching the rotatable seal ring of a mechanical seal to a plain shaft going through said seal ring.

2. Description of the Prior Art

Mechanical seal fasteners of different kinds are known. It is thus common to use stop bolts or tightening screws. When such fasteners are used it is, however, necessary that the seal is within reach from the side which is not always possible.

It is further well known to use a cylindric pin, a wedge or a ball recessed in the shaft. This means, however, that the shaft will be weakened and besides the pin, the wedge or the ball may easily be dropped during mounting and demounting works.

Other known devices are conical casings and splines which also have some disadvantages, i.e. that they are expensive.

SUMMARY OF THE INVENTION

According to the invention the problem to attach a rotatable seal ring to a plain shaft is solved by using a grip ring, which with spring force may be entered into a housing supporting the rotatable seal ring, which housing has an essentially circular recess of a certain axial extension which decides the free spring length for spring means arranged between the rotatable seal ring and its housing which spring means press the rotatable seal ring against the non-rotatable seal ring.

The invention brings about that the rotatable seal will be easily releasable from the shaft but at the same time a good driving and a correct locking in the axial direction is obtained. Such a device, a mechanical seal fastening, may also be used for attaching the non-rotatable seal ring to a non-movable seat.

BRIEF DESCRIPTION OF THE DRAWINGS

FIG. No. 1 shows a cross-section of the mechanical seal and FIG. No. 2 shows a grip ring for securing the seal.

DESCRIPTION OF THE INVENTION

Figure 1:
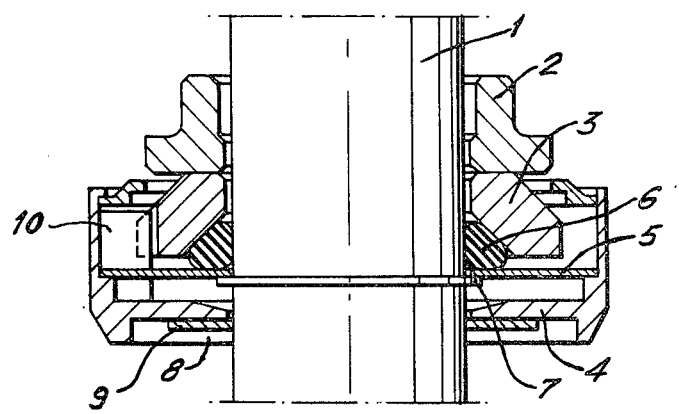
Figure 2:
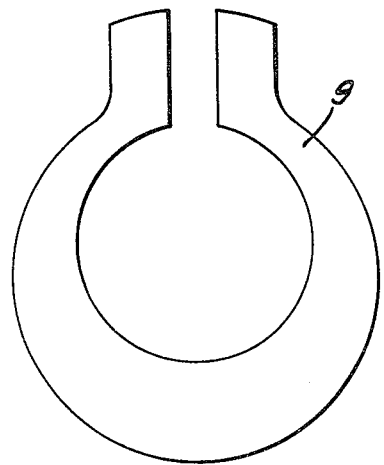

In the figures, 1 stands for a shaft, 2 a non-rotatable seal ring, 3 a rotatable seal ring, 4 a housing, 5 a disc spring, 6 an O-ring, 7 a support ring, 8 a recess in the housing 4, and 9 a grip ring. A key 10 is used to prevent relative rotation between housing 4 and the rotatable seal ring 3.

The seal is thus consisting of a non-rotatable seal ring 2, which is supported by a non-rotatable part of the construction. The seal ring 3 rotates with the shaft and is pressed against the seal ring 2 by the force of a disc spring 5.

The seal ring 3 is supported axially movable in the housing 4 by an O-ring 6 and a support ring 7, which in their turn are supported by the disc spring mentioned. The latter is in its turn supported by an annular shoulder formed on the inner periphery of the housing 4.

The housing 4 is easily slidable onto the shaft 1 and is attached to the latter by a grip ring 9 which is formed like a relatively thick non-closed ring, which normally has an inner diameter less than the diameter of the shaft 1. By expanding the grip ring, it is possible to make it enter the shaft. In the housing 4 an axial circular recess 8 meant for receiving the grip ring 9 is arranged.

The mounting of the seal takes place in the following way:

The non-rotatable seal ring 2 is entered onto the shaft 1 and is slid to a position where it touches its non-rotatable seat. The housing 4 including the rotatable seal ring 3 and the disc spring 5 and finally the grip ring 9 are also entered onto the shaft. To make the grip ring enter it is mounted on a special tool which controls the grip ring with regard to the shaft and which expands it so its inner diameter gets big enough to allow it to enter the shaft. The grip ring is brought against the housing 4 and so presses the rotatable seal ring 3 against the non-rotatable ring 2. The pressure should be strong enough that the force of the disc spring 5 is totally overcome. When the grip ring has reached this position, the grip ring is released from the tool and is locked to the shaft by its own spring force.

During this operation when the grip ring is expanded, the grip ring 9 is only in contact with the gable of the housing 4 along its periphery which means that the grip ring has not been received in the recess 8. The recess has a shape that conforms to the grip ring, however, only when the grip ring has a certain angular registration with the housing 4 and is in the relaxed condition will the ring enter the recess. In all other positions the grip ring is thus prevented from being received in the recess 8. The housing 4 is now turned with regard to the shaft 1 and the grip ring till the position is reached where the grip ring may be received in the recess 8. Since the grip ring is fixed on the shaft, the housing 4 will move towards the grip ring influenced by the force from the disc spring 5. The axial movement of the housing 4 will then be exactly as long as the axial depth of the recess 8. When the grip ring 9 has been received in the recess, the housing 4 as well as the rotatable seal ring 3 will be driven by the grip ring and so by the shaft.

The length of the movement of the housing 4 will exactly decide how much the disc spring 5 is allowed to expand. This means that by choosing the depth of the recess 8 with regard to, i.e. the spring constant of the disc spring, a correct spring length is obtained. It is then possible to be independent of other close tolerances in the construction such as shoulders or notches in the shaft, the seat for the non-rotatable seal ring etc. The two seal rings will always take the right position with regard to each other which, of course, is very important for obtaining a good sealing.

As the distance between the two seal rings may be so exactly decided, it is possible to use a disc spring with a high spring constant. Such springs are depending on a very great precision at that point to operate satisfactory.

Disc springs have a lot of advantages. They demand very little space in the axial direction and the spring force is exactly the same around the whole periphery.

Under certain circumstances, if the rotatable ring takes a position somewhat inclined with regard to the shaft, the disc spring means that the risks for a worse sealing result decrease.

According to the invention, a mechanical seal is obtained which may be easily mounted on a plain shaft and which, independent of tolerances in other parts of the construction, automatically takes a correct position by the mounting. As a special advantage, it may be mentioned that this type of mechanical seal may replace other more conventionally built seals in older constructions.

What is claimed is:

1. A mechanical shaft seal, comprising:

a fixedly mounted non-rotatable seal ring disposed about a shaft;

a rotatable seal ring disposed about said shaft for sealing engagement with the non-rotatable seal ring;

a housing disposed about said shaft and in non-rotatable engagement with said rotatable seal ring;

spring means disposed about said shaft and having one portion thereof supported by said housing and another portion thereof in connection with said rotatable seal ring; and an expandable grip ring disposed about said shaft for gripping the same at a particular axial position, said housing having a recess formed in an outermost surface thereof for receiving said grip ring when the grip ring is in an unexpanded condition so that the grip ring may be expanded during assembly to engage the outermost surface of the housing and pressed towards the non-rotatable seal ring with a force sufficient to collapse the spring means, after which the grip ring may be released to grip the shaft and clear the outermost surface of the housing so that the housing may move away from the non-rotatable seal ring by a distance determined by the depth of the recess of the housing to thereby relax the spring means to provide a predetermined amount of spring tension.

2. A device according to claim 1, wherein the spring means is a circular disc spring.

3. A device according to claim 1 wherein the recess formed in the housing has a shape that corresponds to the outline of the grip ring.

4. A device according to claim 3 wherein the grip ring has one or more radially directed lugs so that the grip ring may fit in the recess of the housing only when the grip ring and housing are in a particular angular orientation with regard to each other so that the housing may not be turned relative to the grip ring and the shaft when the grip ring is received in the recess.

* * * * *